W. E. Barton,

Sleigh Bell.

No. 4,185. Reissued Nov. 29. 1870.

WITNESSES:

Jas L. Ewin
Wm. H. Brereton

W. E. Barton
By Knight Bros Attys

N. PETERS, PHOTO-LITHOGRAPHER, WASHINGTON, D. C.

United States Patent Office.

WILLIAM E. BARTON, OF EAST HAMPTON, CONNECTICUT.

Letters Patent No. 46,623, dated March 7, 1865; reissue No. 4,185, dated November 29, 1870.

IMPROVEMENT IN ATTACHING SLEIGH-BELLS TO STRAPS.

The Schedule referred to in these Letters Patent and making part of the same.

I, WILLIAM E. BARTON, of East Hampton, in the county of Middlesex and State of Connecticut, have invented a new and useful Improvement in Attaching Sleigh-Bells, which is described as follows:

*Nature and Objects of the Invention.*

My invention, as a whole, is designed to effect the stringing of sleigh-bells by attaching them to straps, of leather, or other suitable material, by means of metallic fastenings, which may be readily taken apart, to remove the bells for cleaning and polishing, or to replace broken bells or parts of the fastening; also, to hold the bell at a little distance from the strap, and out of contact therewith and separate therefrom, by a metallic seat, formed to receive the bell, so as to insure a more perfect vibration of the bell than it would have if secured directly to the leather strap, and also to make the bell appear to better advantage.

My said invention consists in casting a short metal boss upon the bell, and making a screw-hole through the middle thereof. The boss may be oval, square, or other than circular in form.

In a metallic seat, having a recess the reverse of the form of the boss on the bell, adapted to receive the same, and, at the same time, keep it from contact with the strap, the seat having a hole through it for the coupling-screw to pass, and the back of the seat, or that part which is in contact with the strap, having holding points or projections, to keep the seat in place by imbedding in the strap.

In a countersunk hole in the strap, the countersink being adapted to the flaring washer and screw-head, so that the fastening may be screwed tight without puckering the strap.

In a flaring-washer or binder placed in the countersink in the leather, and on the opposite side from the metallic bell-seat, for the purpose of a metal bearing for the head of a coupling or clamping-screw, which draws and holds all the parts together, and in the general arrangement and combination of the above-mentioned parts as a mode of attaching bells to straps.

*Description of the Accompanying Drawing.*

*General Description.*

Figure 1:
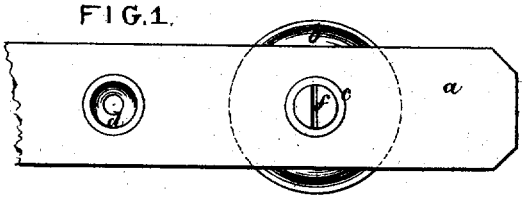
Figure 1 is a back view of the strap, bell, and attachments.
Figure 2:
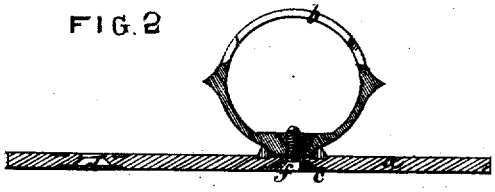
Figure 2 is a longitudinal section of the same.
Figure 3:
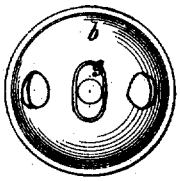
Figure 3 is a back view of the bell.
Figure 4:
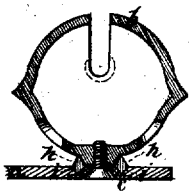
Figure 4 is a section of the bell, strap, and fastenings.
Figure 5:
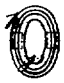
Figure 5 is a view of the outer face of the metallic eat.
Figure 7:
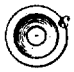
Figure 7 is a plan of the flaring or conical washer.
Figure 6:
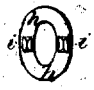
Figure 6 is a back view of the said bell-seat.
Figure 8:
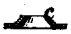
Figure 8 is a longitudinal section thereof.

*a* may represent a strap, of any proper material and construction.

*b* is the bell, cast with a boss or projection, *g*, within which is an aperture threaded for the reception of the coupling or attaching-screw *f*.

The head of the coupling-screw is received within a conical or flaring washer, *c*, which fits a countersink, *d*, in the back of the strap.

*h* is a bell-seat, which is, preferably, made of metal, of elliptical or other non-circular form, with a cavity, *j*, in its face, to fit the boss or projection *g* of the bell.

*i i* are points or projections on the under surface of the bell-seat, to prevent it turning on the strap.

The short bell-boss is less liable to break than the longer shank now in comman use.

The metallic seat *h*, whether the bell be screwed or riveted to the strap, gives a broad and firm bearing to the bell, insures a more perfect vibration, and, at the same time, throws it out boldly to view, giving it a larger and more prominent as well as a more graceful appearance.

The use of a coupling-screw instead of a rivet gives capacity to tighten up the bells should they become loose, as well as to remove them for cleaning, or replacing broken parts.

The flaring washer and countersunk hole, with a flat-headed screw, gives solidity as well as even surface to the side of the strap which comes next to the horse or harness.

*Claims.*

I claim as my invention—

1. A seat, *h*, of hard material, interposed between a sleigh-bell and its strap, substantially as and for the purposes set forth.

2. The metallic seat, having a recess conforming to the boss of the bell, a hole for the coupling-screw to pass, and holding-surfaces on the leather side to keep the seat in place, substantially as described.

3. In combination, the bell with the short boss and screw-hole, the metallic seat, strap, and coupling-screw, substantially as described.

4. In combination, the coupling-screw, flaring-washer, strap, metallic seat, and bell, substantially as described.

WM. E. BARTON.

Witnesses:
JOHN WATROUS,
A. W. BARTON.